United States Patent [19]

Dietz

[11] Patent Number: 5,299,531
[45] Date of Patent: Apr. 5, 1994

[54] MUZZLE

[76] Inventor: David Dietz, 2084 Flatbush Ave., Brooklyn, N.Y. 11234

[21] Appl. No.: 976,959

[22] Filed: Nov. 16, 1992

[51] Int. Cl.⁵ .............................................. A01K 25/00
[52] U.S. Cl. ..................................................... 119/832
[58] Field of Search ........................ 119/129, 130, 133; 54/80.3, 80.5

[56] References Cited

U.S. PATENT DOCUMENTS

| | | | |
|---|---|---|---|
| D. 316,764 | 5/1991 | Edwards | 119/130 X |
| 1,052,749 | 2/1913 | Peelman | 54/80.3 |
| 4,519,187 | 5/1985 | Reynolds | 54/80.3 |

FOREIGN PATENT DOCUMENTS 103870  5/1938  Australia .............................. 119/133

Primary Examiner—Robert P. Swiatek
Attorney, Agent, or Firm—Cohen, Pontani, Lieberman & Pavane

[57] ABSTRACT

A muzzle worn on the snout of an animal includes a pair of oppositely-disposed opaque, continuous, imperforate sheets of material positioned at the respective sides of the animal's snout. A flexible netting connects the two pieces of material on three sides to form an enclosure that slides over the animal's snout. An adjustable strap is attached to the open end of the enclosure and extends from a point near the animal's throat to a point behind the animal's ears to form a collar around the animal's head and neck. A suitable fastener is affixed to the strap so that the length of the strap can be adjusted for maximum comfort and fit on the animal's head. The resultant muzzle allows the dog complete breathing ability while restricting dog bites and is almost impossible for the dog to pull off.

13 Claims, 2 Drawing Sheets

MUZZLE

BACKGROUND OF THE INVENTION

Oftentimes an animal, particularly a domesticated animal such as a dog, is very sensitive to being handled in a certain way, particularly when it is being groomed or is being examined by a veterinarian. The animal can under such circumstances take on a behavior totally at odds to its usual, friendly manner, and may injure the handler out of simple fear or a perceived need for self-defense. The animal may panic and show its teeth to threaten the handler, or go on to the next step and actually bite or attempt to bite the handler. Conventional, known muzzles are usually positioned around the animal's jaws and nose to keep the animal's mouth shut and may thereby protect the handler from being bitten, but they often also cause the dog to become unusually nervous or agitated. When the animal gets nervous, it opens its mouth to accommodate more rapid breathing and, if the muzzle prevents the animal from opening its mouth, it may be driven to further or increased panic and become physically uncontrollable or, at the very least, unable to be kept sufficiently still to permit the grooming or veterinarian technique to proceed.

For the foregoing reasons, there is a need for a muzzle that will not only protect the handler from being bitten, but will also allow natural movement of the animal's mouth to facilitate a normal breathing pattern.

OBJECTS AND SUMMARY OF THE INVENTION

It is therefore an object of the present invention to provide a muzzle that allows an animal to breathe naturally while the muzzle is secured about the animal's head.

It is a further object of the invention to provide a muzzle configured of tear-resistant sheets, preferably of nylon material, a flexible but strong netting interposed between and spanningly connecting the sheets of material, and an adjustable strap, preferably also of nylon material, that together provide sufficient durability to withstand repeated use.

It is another object of the invention to provide such a muzzle with an adjustable strap so that the muzzle may be comfortably fitted to the animal's head in such fashion that the animal will be unable to remove it.

It is a yet further object of the invention to provide such a muzzle having a quick-release fastener that will enable the handler to remove the muzzle quickly, if necessary.

The present invention is directed to a novel animal muzzle configured and constructed so that, when securely fastened about the animal's head, it allows natural movement of the animal's mouth to thereby facilitate a normal breathing pattern and, at the same time, protects the animal's handler from being bitten. Such a muzzle is contemplated to be most often used with dogs, but it should be recognized that the inventive muzzle can be adapted, as and if necessary, for use on any animal having a generally elongated snout. A muzzle having the features and attributes of the present invention is formed of a pair of confrontingly oppositely disposed, preferably opaque sheets of material connected by a flexible netting along and spanning three side edges of the sheets to form an open-ended enclosure which slides over the projecting jaws and nose, commonly referred to as the snout, of the animal. When in its intended operative position, the oppositely-disposed sheets of material cover the respective left and right sides of the snout, and the flexible netting extends downwardly from the top of the snout, over the animal's mouth, and terminates under its chin. The enclosure is so shaped as to allow the animal to open and close its mouth at will and to breathe easily; however, since the enclosure extends continuously about the animal's snout, the animal is effectively prevented from biting its handler.

The open rearward end of the muzzle has affixed thereto a strap that extends behind the animal's ears and which, in conjunction with the rear of the enclosure, forms a collar that maintains the placement of the muzzle about the animal's head.

These and other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

DETAILED DESCRIPTION OF THE PREFERRED EMBODIMENTS

Figure 1:
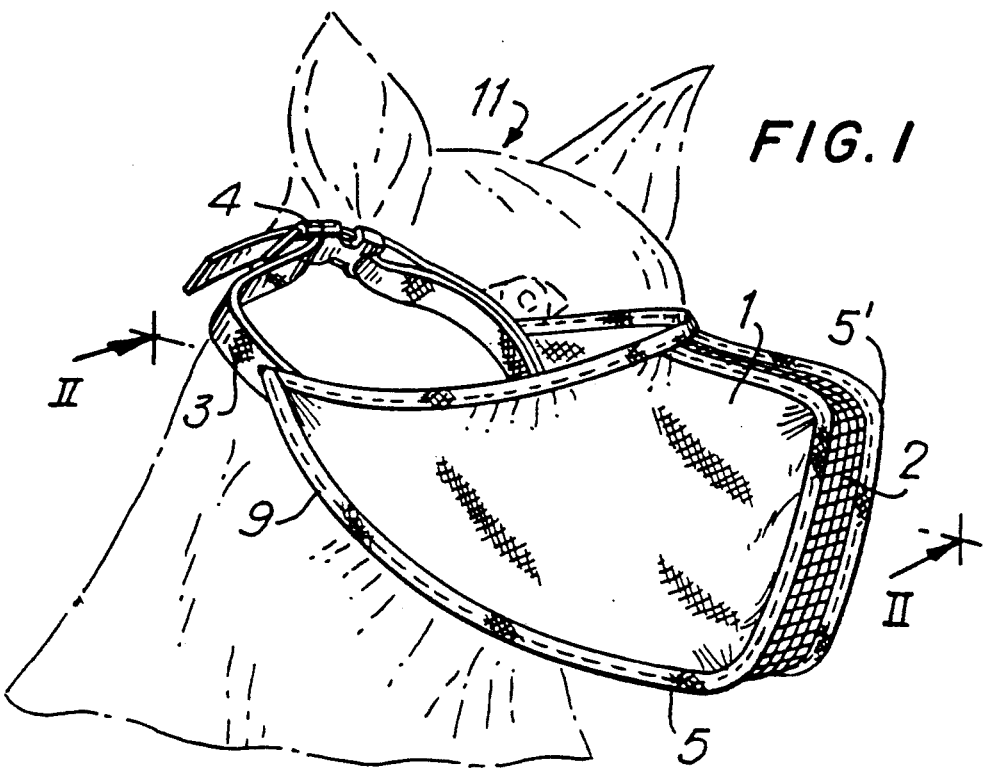
FIG. 1 is an elevated perspective view of a muzzle constructed in accordance with the teachings of the present invention as operatively worn by an animal, specifically a dog.
Figure 3:
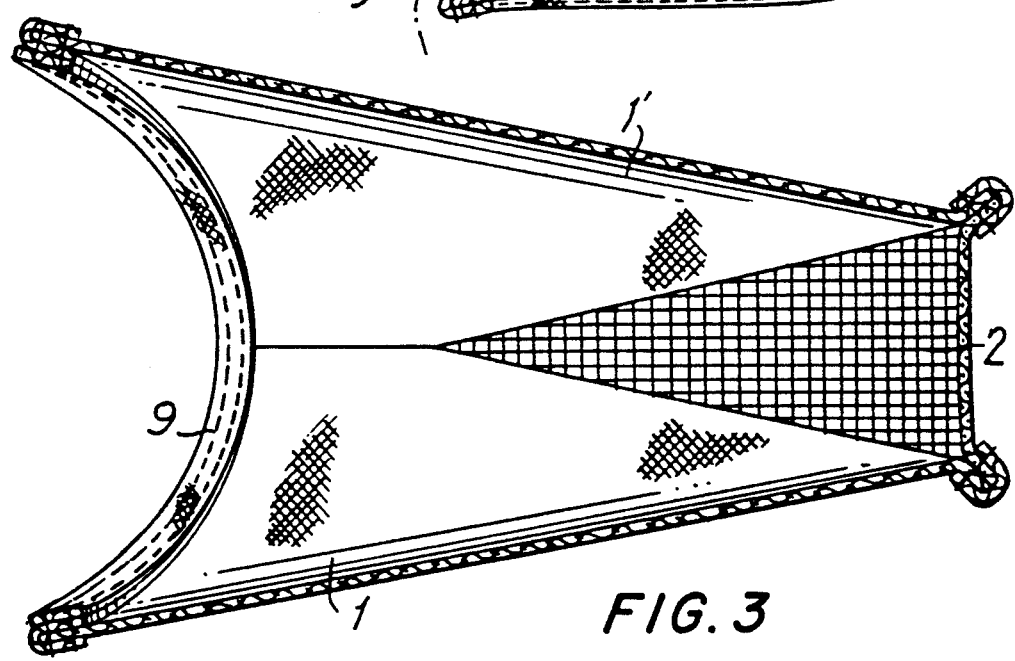
FIG. 3 is a cross-sectional view taken along the lines III—III in FIG. 2.

With initial reference to FIGS. 1 and 3, there is shown a muzzle 10 constructed in accordance with the teachings of the present invention and disposed in operative position about an animal's head 11, the animal depicted being a dog. While the muzzle 10 is shown for illustrative purposes on a dog's head, it will be recognized that the muzzle may be effectively utilized on any animal having a generally elongated jaw and nose, otherwise commonly referred to as the animal's snout.

The muzzle 10 is formed of a pair of confrontingly oppositely disposed, opaque, continuous, preferably imperforate sheets of material 1, 1' which are operatively positioned at the respective right and left sides of the animal's snout, and a continuous web or strip of flexible netting 2 which is interposed spanningly between and connected to the sheets 1, 1' along or closely proximate the top, front and bottom edges of the sheets by way of stitched seams 5, 5'. In a preferred embodiment, the sheets 1, 1' are fabricated of a virtually tear-resistant, reasonably pliable or flexible material such, for example, as a multi-layered nylon, although those skilled in the art will recognize that other high-strength, reasonably flexible fabrics may also be employed. The flexible netting 2 preferably comprises an approximately fifty percent transparent, pliable mesh, formed for example of a plastic or plasticized material and having sufficient puncture resistance to prevent the animal from biting through or otherwise tearing the mesh while providing sufficient air-permeability to allow the animal to breath therethrough. The resultant muzzle 10 is configured as an open-ended enclosure that is slipped over the animal's snout and is there secured behind the animal's ears by an adjustable strap 3. The sheets 1, 1' are predeterminately sized and shaped—in general accordance with the size and shape of the snout of the animal upon which the muzzle is to be used—to enable the animal to partially open its mouth and breath normally when in place about the animal's head 11.

In a currently preferred construction, the height of the sheets 1, 1' of the muzzle 10 is about five inches, sufficient to accommodate the natural opening and closing movements of an animal's—such as a dog's—mouth. The flexible netting 2, interposed spanningly between and connecting the sheets 1, 1', is about one and one half inches wide at its widest position at the front of the muzzle 10 and is sufficiently air-permeable to pass air through the netting without obstruction, thereby permitting a normal breathing pattern by the animal. The currently preferred length of the muzzle 10 is approximately seven inches from front to back as measured along the length of the snout. The muzzle 10 thus fully encircles the animal's snout, providing a suitable protective guard against possible biting or nipping. The length of the muzzle allows a rear edge of the muzzle 10 along seam 9, from which strap 3 emerges, to be positioned back along the animal's jaw under the eyes and ears. This deters the animal from engaging in an instinctive attempt to remove the muzzle from its snout by preventing the animal from getting a proper hold on an edge of the muzzle 10 as for example along the open end. The muzzle 10, while designed to fit over the snout, does not extend so far rearwardly as to cover the eyes, since covering the eyes may be an additional cause of stress and agitation to the animal.

Figure 2:
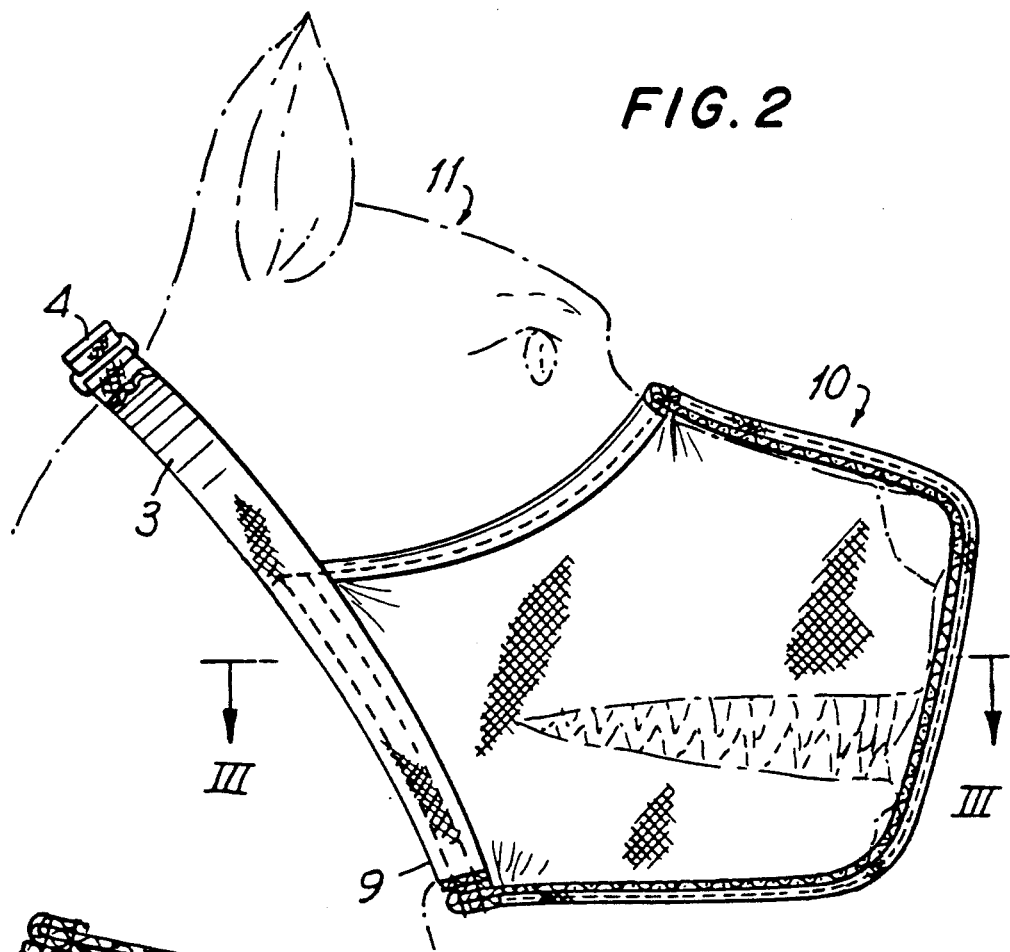
FIG. 2 is a cross-sectional view taken along lines II—II in FIG. 1.

As seen in FIGS. 1 and 2, the strap 3 is affixed to the interior wall of the open end of the enclosure, typically by stitching, as along stitched seam 9. The strap 3 may be configured as a continuous strap or may, alternately, merely consist of two mutually engageable strap portions (not shown) extending from opposite sides of the muzzle 10, although it will be recognized that a continuous strap may offer greater strength. The strap is preferably formed of a woven nylon belt, but may also be constructed of leather or other similar material of sufficient strength to prevent the animal from tearing it loose with a paw, hoof or otherwise. The ends of strap 3 are secured together by a fastening means 4, typically a buckle, through which the length of strap 3 may be adjusted for a comfortable and appropriately dimensioned fit around the animal's head 11. In a preferred embodiment, the buckle is of the side-squeeze, quick-release variety, but may also be in the form of a traditional hole and stem buckle, snap, Velcro TM -type hook and loop fastener, or other sufficiently strong fastening device.

As seen in FIG. 2, the strap 3 is intended to be oriented in much the same manner as a collar about an animal's neck, extending from under the animal's jaw proximate the throat, encircling the neck, and extending around the back of the animal's head, under the ears. This strap arrangement facilitates proper fit by tension around the animal's neck and head, and ensures a proper and readily-attained securement of the muzzle.

Figure 4:
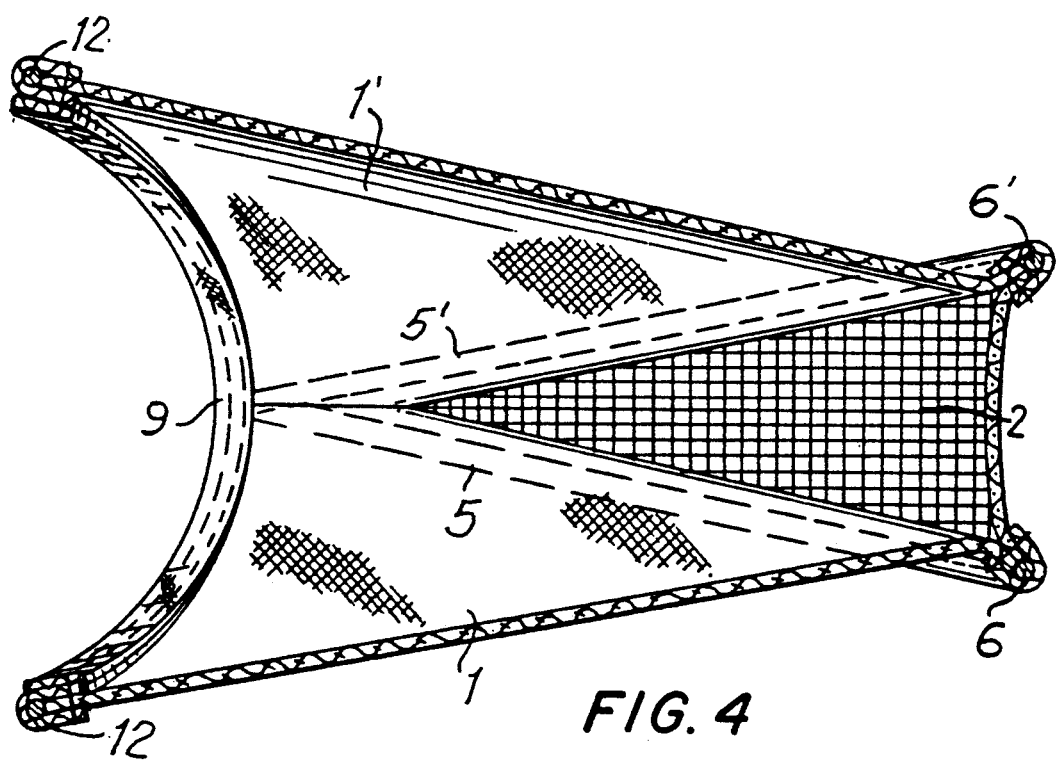
FIG. 4 is a cross-sectional view taken along the lines III—III in FIG. 2 and depicting an alternate, modified embodiment of the invention, including a preferred location for receipt of semi-rigid, shape-retaining members along the bottom and rear edges of the muzzle.

In an alternate embodiment, depicted in FIG. 4, the muzzle 10 may be reinforced along the seams 5, 5' and-/or the seam 9 by the provision of elongated pockets or channels for receiving semi-rigid or rigid rod-like elements 6, 6' and 12, such as plastic or metal rods, thereby enabling the muzzle to better retain its general shape during repeated use or where the muzzled animal is particularly active.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. It is the intention, therefore, to be limited only as indicated by the scope of the claims appended hereto.

What is claimed is:

1. A muzzle, worn on the snout of an animal to prevent the animal from biting, said muzzle comprising:
   a pair of flexible sheets of continuous, imperforate material for operative positioning at the respective sides of an animal's snout, said flexible sheets being predeterminately configured and dimensioned so that when said flexible sheets are operatively positioned, said flexible sheets substantially cover the sides of the animal's snout;
   a pliant, air permeable sheet of material spanningly connected to and between said flexible sheets such that when said flexible sheets are operatively positioned at the respective sides of an animal's snout, said air permeable sheet covers a portion of the top of the animal's snout proximate the animal's nose, the front of the animal's snout, and a portion of the bottom of the animal's snout;
   said flexible sheets and said air permeable sheet forming an enclosure which operatively envelopes the animal's snout so as to prevent the animal from biting while simultaneously permitting the animal to open and close its mouth and to easily breathe through the enclosure; and
   means for removably fastening the enclosure about the head of the animal to prevent removal by the animal while permitting selective fastening and removal by an animal handler.

2. The muzzle according to claim 1, wherein said air permeable sheet comprises a tear-resistant mesh fabric.

3. The muzzle according to claim 2, wherein the enclosure is predeterminately configured and dimensioned so that the enclosure substantially completely envelopes the animal's snout while permitting the animal full visibility.

4. The muzzle according to claim 3, wherein said removable fastening means comprises a collar integrally formed along an edge of the enclosure and oriented so as to encircle the head and neck of the animal from a point beneath the snout proximate the animal's throat to a point behind the head of the animal proximate the base of the animal's ears.

5. The muzzle according to claim 4, wherein said removable fastening means further comprises means for adjusting the length of said collar.

6. The muzzle according to claim 5, wherein said removable fastening means comprises a side-squeeze, quick-release, adjustable buckle.

7. The muzzle according to claim 3, wherein the connection between said pair of flexible sheets and said air permeable sheet is a first sewn seam.

8. The muzzle according to claim 7, wherein said removable fastening means comprises an elongated strap having a portion stitched along an edge of the enclosure via a second sewn seam.

9. The muzzle according to claim 8, wherein the enclosure further comprises at least one semi-rigid member extending in substantially parallel relation to the length of the animal's snout so as to stiffen the enclosure such that the enclosure retains a shape substantially conforming to the shape of the animal's snout.

10. The muzzle according to claim 9, wherein the enclosure further comprises at least one semi-rigid member extending along an edge of the enclosure in substantially parallel relation to said second seam so to stiffen the enclosure such that the enclosure retains a shape substantially conforming to the shape of the animal's throat.

11. A muzzle, worn on the snout of an animal to prevent the animal from biting, said muzzle comprising:
- a pair of flexible sheets of material for operative positioning at the respective sides of an animal's snout, said flexible sheets being predeterminately configured and dimensioned so that when said flexible sheets are operatively positioned, said flexible sheets substantially cover the sides of the animal's snout;
- a pliant, air permeable sheet of tear-resistant mesh fabric material spanningly connected to and between said flexible sheets at a first sewn seam such that when said flexible sheets are operatively positioned at the respective sides of an animal's snout, said air permeable sheet covers a portion of the top of the animal's snout proximate the animal's nose, the front of the animal's snout, and a portion of the bottom of the animal's snout;
- said flexible sheets and said air permeable sheet forming an enclosure which operatively envelopes the animal's snout so as to prevent the animal from biting while simultaneously permitting the animal to open and close its mouth and to easily breathe through the enclosure, said enclosure being predeterminately configured and dimensioned so that the enclosure substantially completely envelopes the animal's snout while permitting the animal full visibility; and
- means for removably fastening the enclosure about the head of the animal to prevent removal by the animal while permitting selective fastening and removal by an animal handler, said fastening means comprising an elongated strap having a portion stitched along an edge of the enclosure via a second sewn seam.

12. A muzzle in accordance with claim 11, wherein the enclosure further comprises at least one semi-rigid member extending in substantially parallel relation to the length of the animal's snout so as to stiffen the enclosure such that the enclosure retains a shape substantially conforming to the shape of the animal's snout.

13. A muzzle in accordance with claim 12, wherein the enclosure further comprises at least one semi-rigid member extending along an edge of the enclosure in substantially parallel relation to said second seam so as to stiffen the enclosure such that the enclosure retains a shape substantially conforming to the shape of the animal's throat.

* * * * *